United States Patent
Yu et al.

(10) Patent No.: US 9,292,808 B2
(45) Date of Patent: Mar. 22, 2016

(54) DATA MANAGEMENT FOR TOP-DOWN RISK BASED AUDIT APPROACH

(75) Inventors: Haiyang Yu, Shanghai (CN); Ying Zeng, Fremont, CA (US); Chihhe Chiu, San Francisco, CA (US); Richard Choi, San Francisco, CA (US); Agnes DiMayuga, Mountain View, CA (US); Cheng Hu, Palo Alto, CA (US); Martin Orsag, Brno (CZ); Xing Zhao, Shanghai (CN); Donghua Zhou, Shanghai (CN)

(73) Assignee: SAP SE, Walldorf, DE (US)

( * ) Notice: Subject to any disclaimer, the term of this patent is extended or adjusted under 35 U.S.C. 154(b) by 1155 days.

(21) Appl. No.: 12/832,532

(22) Filed: Jul. 8, 2010

(65) Prior Publication Data

US 2011/0251930 A1  Oct. 13, 2011

(30) Foreign Application Priority Data

Apr. 7, 2010 (CN) .......................... 2010 1 0140754

(51) Int. Cl.
  *G06Q 20/10* (2012.01)
  *G06Q 10/06* (2012.01)
  *G06Q 40/00* (2012.01)
  *G06Q 40/02* (2012.01)

(52) U.S. Cl.
  CPC .............. *G06Q 10/06* (2013.01); *G06Q 40/12* (2013.12)

(58) Field of Classification Search
  CPC .................... G06F 17/30595; G06F 17/30427; G06F 17/3043; G06F 17/30448; G06Q 40/06; Y10S 707/99933; Y10S 707/99942
  See application file for complete search history.

(56) References Cited

U.S. PATENT DOCUMENTS

| | | | | |
|---|---|---|---|---|
| 6,772,034 | B1* | 8/2004 | Shi | G05B 19/4188 700/108 |
| 7,305,404 | B2* | 12/2007 | Owens | G06F 17/30595 |
| 7,509,275 | B2* | 3/2009 | Glinberg | G06Q 40/00 705/35 |
| 7,549,162 | B2* | 6/2009 | Aaron | G08B 13/19656 726/12 |
| 7,711,636 | B2* | 5/2010 | Robida | G06Q 20/10 340/5.4 |
| 7,895,111 | B2* | 2/2011 | Mocciolo | G06Q 20/10 705/35 |
| 7,895,448 | B1* | 2/2011 | Satish | G06F 21/577 713/187 |
| 7,930,228 | B1* | 4/2011 | Hawkins | G06Q 10/0635 705/35 |
| 2002/0087558 | A1* | 7/2002 | Bailey | G06F 17/30398 |
| 2003/0046128 | A1* | 3/2003 | Heinrich | G06Q 40/08 705/7.28 |
| 2004/0015375 | A1* | 1/2004 | Cogliandro | G06Q 30/018 705/317 |
| 2004/0083222 | A1* | 4/2004 | Pecherer | G06F 17/30595 |
| 2005/0080791 | A1* | 4/2005 | Ghatare | G06F 17/30427 |
| 2005/0108084 | A1* | 5/2005 | Ramamoorti | G06Q 20/108 705/70 |
| 2006/0059066 | A1* | 3/2006 | Glinberg | G06Q 40/00 705/35 |

(Continued)

*Primary Examiner* — F. Zeender
*Assistant Examiner* — Dana Amsdell
(74) *Attorney, Agent, or Firm* — Fountainhead Law Group PC

(57) ABSTRACT

Particular embodiments generally relate to providing risk management. In one embodiment, a first risk is linked to an account group assertion in a data structure. A second risk is linked to a control objective in the data structure. Access to the first risk is granted through the account group's assertion. Access to the second risk is granted through the control objective. Risk management is then performed using the accessed first risk and second risk.

20 Claims, 12 Drawing Sheets

(56) References Cited

U.S. PATENT DOCUMENTS

| | | | |
|---|---|---|---|
| 2006/0167784 A1* | 7/2006 | Hoffberg | G06Q 20/401 705/37 |
| 2007/0022025 A1* | 1/2007 | Litman | G06Q 40/00 705/30 |
| 2007/0033123 A1* | 2/2007 | Navin | G06Q 40/06 705/35 |
| 2008/0004915 A1* | 1/2008 | Brown | G06Q 10/067 705/4 |
| 2008/0221944 A1* | 9/2008 | Kelly | G06Q 10/0635 705/7.28 |
| 2009/0112741 A1* | 4/2009 | Kershner | G06Q 10/0635 705/30 |
| 2009/0113324 A1* | 4/2009 | Spradling | G06Q 10/0635 715/764 |
| 2009/0138410 A1* | 5/2009 | Mocciolo | G06Q 20/10 705/36 R |
| 2009/0248465 A1* | 10/2009 | Recce | G06Q 40/025 705/38 |
| 2010/0153146 A1* | 6/2010 | Angell | G06Q 40/08 705/7.28 |
| 2010/0250423 A1* | 9/2010 | Mintz | G06Q 40/06 705/37 |

* cited by examiner

| Control risk level | | | | | | | |
|---|---|---|---|---|---|---|---|
| High | 3 | 3 | 3 | 3 | 3 | 3 | |
| Medium | 2 | 2 | 2 | 2 | 3 | 3 | |
| Low | 1 | 1 | 1 | 2 | 3 | 3 | |
| N/A | 1 | 1 | 1 | 2 | 3 | 3 | |
| | N/A | Very low | Low | Medium | High | Very high | |

1104

1102

Risk level

DATA MANAGEMENT FOR TOP-DOWN RISK BASED AUDIT APPROACH

CROSS REFERENCE TO RELATED APPLICATION

The present application claims priority to Chinese Application 201010140754.9, filed on Apr. 7, 2010.

BACKGROUND

Particular embodiments generally relate to data management and processing for risk management.

Many regulations exist in which companies must comply. For example, "Auditing Standard No. 5, an Audit of Internal Control over Financial Reporting that is Integrated with an Audit of Financial Statements" (Public Company Accounting Oversight Board, 2007) states that: an auditor should use a top-down approach to the audit of internal control over financial reporting to select the controls to test. A top-down approach begins at the financial statement level and with the auditor's understanding of the overall risks to internal control over financial reporting. The auditor then focuses on entity-level controls and works down to significant accounts and disclosures and their relevant assertions. This approach directs the auditor's attention to accounts, disclosures, and assertions that present a reasonable possibility of material misstatement to the financial statements and related disclosures. The auditor then verifies his or her understanding of the risks in the company's processes and selects for testing those controls that sufficiently address the assessed risk of misstatement to each relevant assertion.

Before Auditing Standard No. 5, a bottom-up approach was used for auditing. For the bottom-up approach, control objectives were first looked at by the auditor. A data model for the bottom-up approach placed risks as attributes of the control objective because the control objectives were accessed first. This allowed the risks to be accessed from the control objectives. However, a top down approach does not access control objectives first and then risks.

The cost for a company to comply with auditing standards, such as Auditing Standard No. 5, may be high. Companies would like to lower the costs for complying with the standards but still be in compliance. However, existing data models may not provide cost savings for a company for a top down approach.

SUMMARY

Particular embodiments generally relate to providing risk management. In one embodiment, a first risk is linked to an account group assertion in a data structure. A second risk is linked to a control objective in the data structure. Access to the first risk is granted through the account group's assertion. Access to the second risk is granted through the control objective. Risk management is then performed using the accessed first risk and second risk.

In one embodiment, a method is provided comprising linking a first risk to an account group assertion in a data structure, linking a second risk to a control objective in the data structure, granting, by a computing device, access to the first risk through the account group assertion, granting, by the computing device, access to the second risk through the control objective, and performing, by the computing device, risk management using the accessed first risk and the second risk.

In another embodiment, a method is provided comprising uploading balance sheet information for a plurality of account groups, determining significant account groups from the plurality of account groups using the uploaded balance sheet information, the significant account groups determined based on a threshold, determining significant sub-processes from the significant account groups, accessing, by a computing device, a risk for a significant sub-process from a data structure, the risk accessed through a link to the significant sub-process, determining a control linked to the risk in the data structure, and evaluating the control for the risk.

In another embodiment, a computer-readable storage medium is provided containing instructions for controlling a computer system to perform a method. The method comprises linking a first risk to an account group assertion in a data structure, linking a second risk to a control objective in the data structure, granting access to the first risk through the account group assertion, granting access to the second risk through the control objective, and performing risk management using the accessed first risk and the second risk.

The following detailed description and accompanying drawings provide a better understanding of the nature and advantages of the present invention.

BRIEF DESCRIPTION OF THE DRAWINGS

FIG. 11 shows an example of a calculation matrix that may be used to determine the level of evidence according to one embodiment.

DETAILED DESCRIPTION

Described herein are techniques for risk management. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
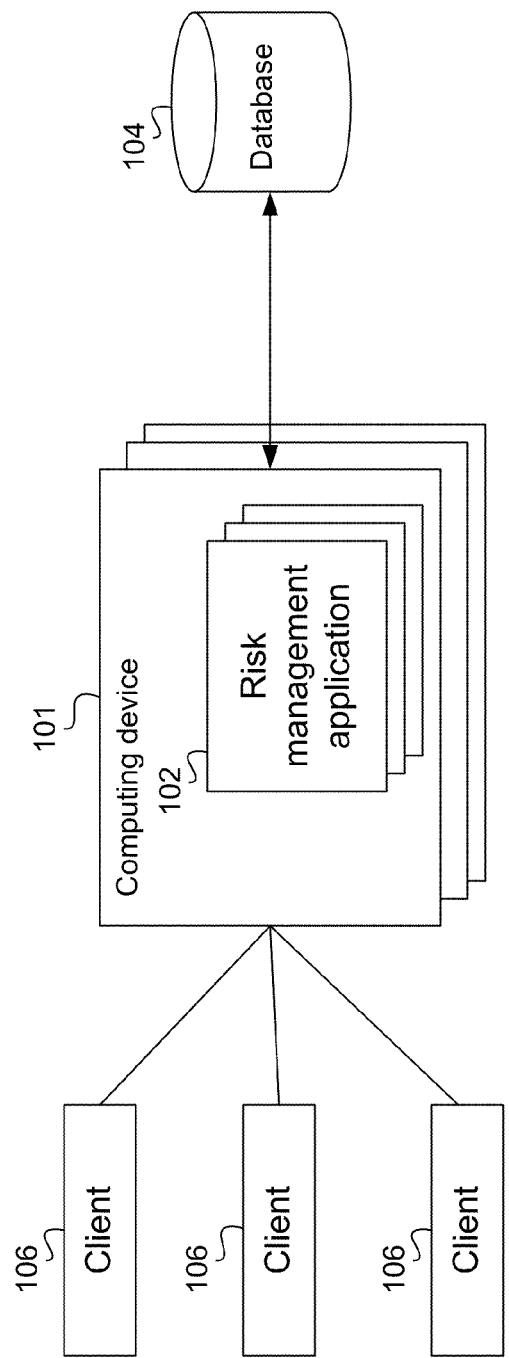
FIG. 1 depicts a simplified system for providing data management for a top down risk-based audit approach according to one embodiment.

FIG. 1 depicts a simplified system 100 for providing data management for a top down risk-based audit approach according to one embodiment. System 100 includes computing devices 101, a risk management application 102, a database 104, and clients 106. It will be understood that any number of the entities shown in system 100 may be provided, such as multiple instances of computing device 101, risk management application 102 and database 104 may be provided.

Risk management application 102 may be part of an enterprise resource planning (ERP) system. Risk management application 102 may be used to perform auditing for a company. For example, a top down risk-based audit may be performed using risk management application 102. Also, risk management application 102 may be used to manage data stored in database 104 and coordinate auditing activities.

Data is stored in database 104 to allow for the top down risk-based audit. As will be described in more detail, a data model is used to describe how the data is represented and stored in database 104. Application 102 may be use the data model to store data as structured data such that a top down risk-based audit can be performed using risk management application 102.

Clients 106 may be used to perform activities related to the top down risk-based audit process. For example clients 106 are used to access or store data. In one embodiment, different clients 106 may be part of different organizations of the company.

Figure 2:
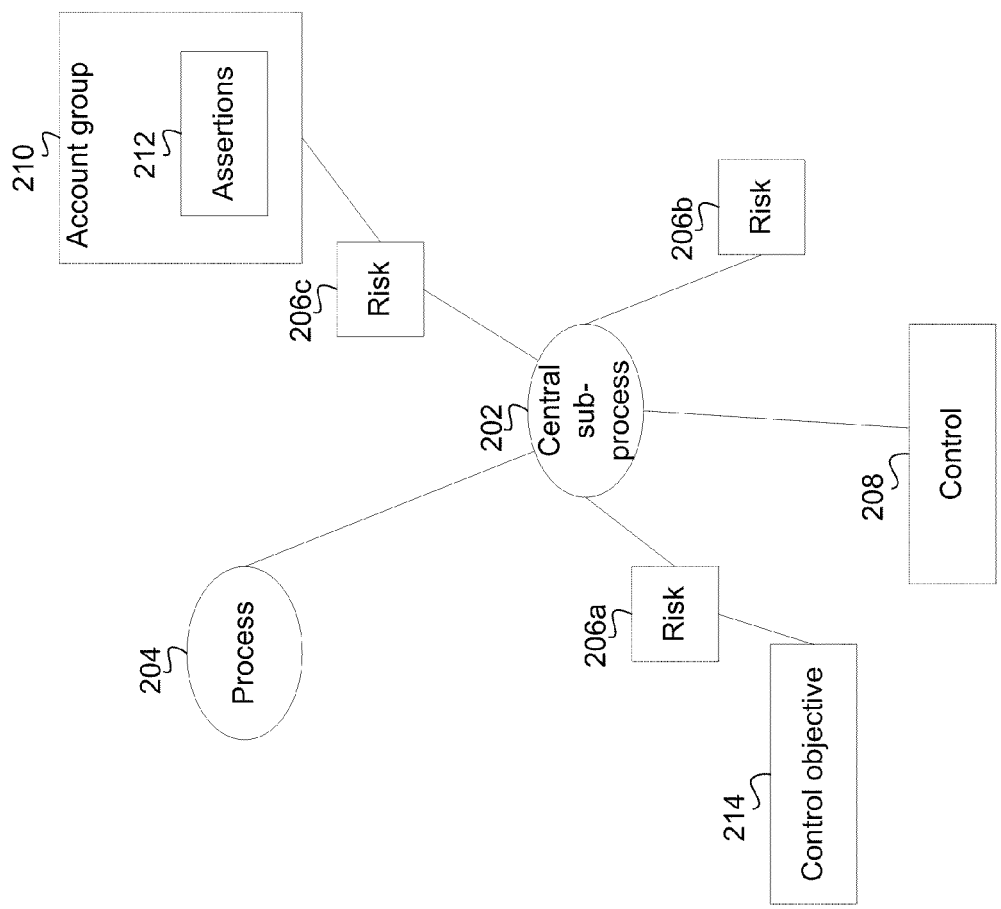
FIG. 2 shows a data model for storing data in a database according to one embodiment.

FIG. 2 shows a data model 200 for storing data in database 104 according to one embodiment. Data model 200 is used to store data in a structured form in database 104. Data model 200 may be modeled for a central sub-process 202, which is part of a process 204. Process 204 may be a business process of a company. For example, the process may be payment processing.

Central sub-process 202 may be part of process 204, such as the cash disbursement part of the payment processing. Central sub-process 202 may be a template that is used by other local organizations of the company for risk management. Local organizations may copy central sub-process 202 and then customize a local sub-process for risk management. This concept will be described in more detail below.

Data model 200 is used to store objects in database 104. The objects may be classified as risks 206, central sub-process 202, controls 208, account groups 210, assertions 212, and control objectives 214. For example, when a risk 206 is discussed, this is an object that includes information (e.g., name, description, risk level, risk likelihood, and risk owner) that is stored in database 104 for a risk. The terms risk 206 and risk object may be used interchangeably. For example, when risk 206 is used, this may mean an object that includes text describing a risk is classified as a risk.

The objects are stored in database 104 based on data model 200. Application 102 may determine a context for an object that identifies it as, e.g., a risk. Then, the object is stored in database 104 with appropriate relationships that are determined based on data model 200. For example, when an object is stored in database 104, a relationship of that object to another object is stored based on data model 200. This gives the data a structure. For example, when objects for control objective 214 and risk 206*a* are stored, data model 200 is used to determine that relationships between the objects that should be stored. The relationship may be based on keys and identifiers for the objects being stored in a relation table as will be described below in more detail. These relationships are then used to access objects in database 104 to perform top-down risk management.

Particular embodiments provide access to risks 206 through central sub-process 202. Risks may be designate an area of the company where there could be a material misstatement relating to an assertion in the financial statements under audit. Assertions, or financial statement assertions, are the pieces of information in financial statements. At a broad level the assertions are total liabilities, assets, revenues and profits. However, the statement can be more detailed. Data model 200 models relationships between risks 206 and central sub-process 202. For example, a risk may be the disbursement of a payment to a wrong person. An object may be created with text that describes this risk. This object is stored as a risk 206*b* in database 104. A relationship may then be stored in database 104 based on data model 200. For example, the object may then be linked to central sub-process 202. In one example, the link may be via foreign key using a risk ID for the object and a sub-process ID for the central sub-process in a relation table. The relation table may store links between data of different tables. The link is formed by associating the risk ID and sub-process ID with the foreign key. When the risk object is accessed via the sub-process object, the sub-process ID may be determined and the link to the risk ID is determined via the foreign key. The risk object is then accessed using the risk ID. This supports the direct assignment of risks 206*b* to central sub-process 202.

Controls 208 may be controls that are created to manage risk. For example, activities may be provided that may be performed to control the risk. Controls 208 may also be linked to risks 206 that are associated with central sub-process 202. For example, a control may be password and address verification for the payment disbursement. Text for this control 208 may be stored in an object. A relationship may then be stored in database 104 based on data model 200. For example, the control object is linked to a risk object. In evaluating risk, controls 208 that are associated with risks 206*a*-206*c* may be accessed and evaluated. This process is described in more detail below.

A control objective 214 is the objective that the control 208 needs to meet. Risk 206*a* may be linked to control objective 214. For example, a control objective may be text describing the objective of a control. The text may be stored in a control objective object. The control objective object may then be stored with a relationship to a risk object in database 104. For example, a link may be via foreign key using a control objective ID for the control objective object and a risk ID for a risk object in the relation table. The control objective object may then be linked to central sub-process 202. For example, the link may be via foreign key using a control objective ID for the control objective object and a sub-process ID for the central sub-process. In this case, the sub-process ID may be used to access the risk object associated with the risk ID.

Risk 206*a* may then be inherited to central sub-process 202. For example, risk 206*a* may be accessed by accessing control objective 214 from central sub-process 202. Then, risk 206*a* may be accessed from control objective 214. The above process supports control objectives for information and related technology (COBIT) and the committee of sponsoring organizations (COSO) practices.

An account group 210 may be a number of accounts that belong to one chart of accounts. For example, the accounts may be different financial accounts. Assertions 212 are linked to account groups 210.

Risk 206*c* is linked to account group assertions 212. For example, account group assertion objects are linked to risk objects in the relation table. Then the assertion objects are linked to central sub-process 202. The account group assertion object is part of an account group 210 so the account group object is first linked with the risk object. In one example, the link may be via foreign key using an object key from account group 210 to a risk ID of risk 206*c*. Assertions 212 are then linked to risk 206*c* via account groups 210 in the relation table. For example, account group assertion 212 may be linked to central sub-process 202 via a foreign key that links the object key from account group 210 that includes assertion 212 with a sub-process ID of central sub-process 202. Risk 206c can then be inherited to central sub-process 202. The inheritance means that risk 206c may be accessed through central sub-process 202. For example, from central sub-process 202, account group 210 is accessed. Risk 206c can then be accessed from account group 210.

Accordingly, data model 200 supports three types of risk assignments to central sub-process 202. Risks may be accessed from central sub-process 202 from three different risk sources.

Figure 3:
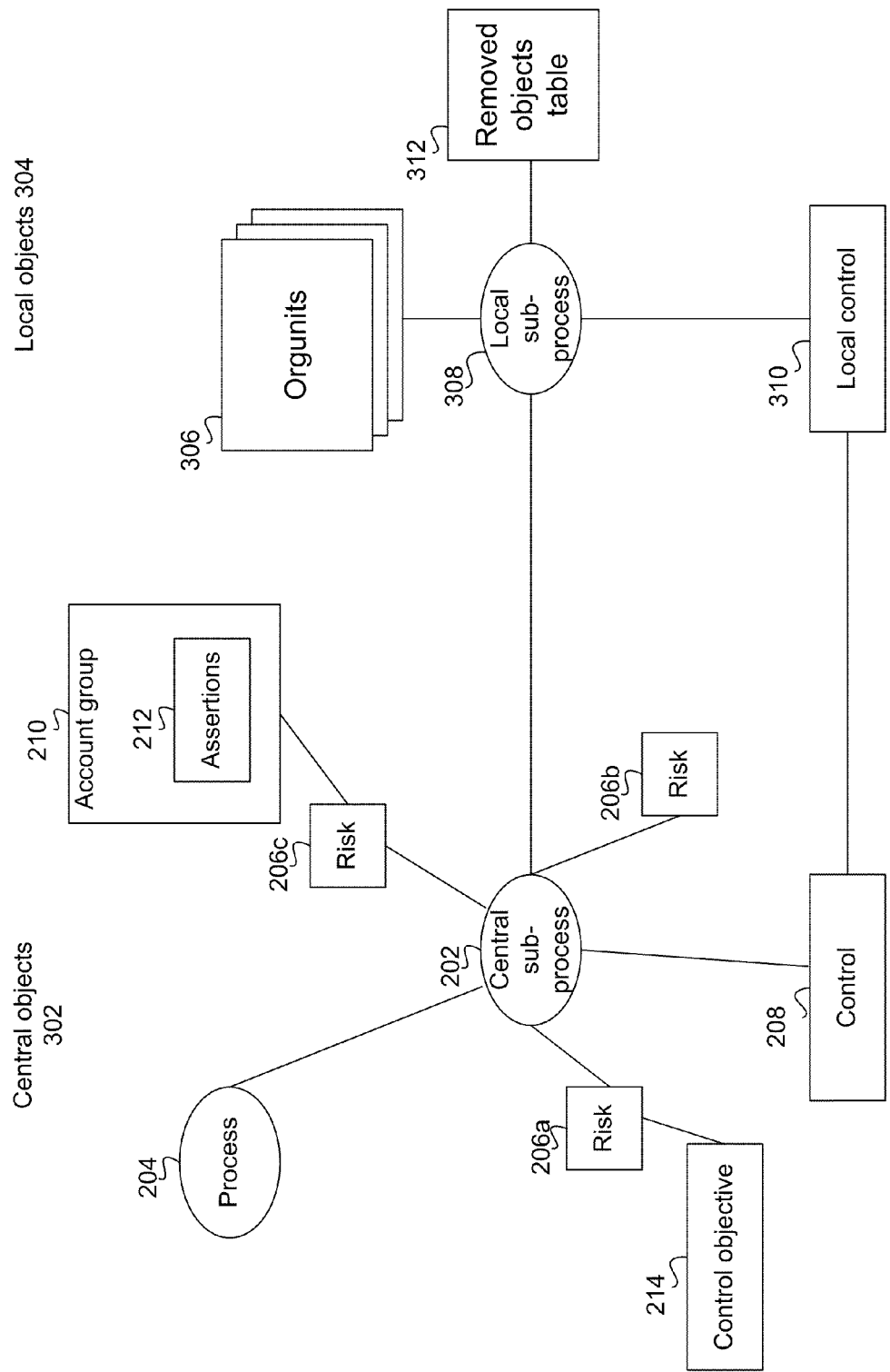
FIG. 3 shows an example of the data model with two levels of data according to one embodiment.

Data model 200 may support two levels of data. For example, central objects and local objects may be supported. Central objects may be used for central modeling of the objects, and used as template to create local objects that are organization specific. FIG. 3 shows an example of data model 200 with two levels of data according to one embodiment. Data model 200 includes central objects 302, which are modeled centrally and are used as a template for copying to local objects 304. Local objects 304 may be created via assignment of central objects 302 to local organizational units (orgunits) 306. Local objects 304 represent a real world data model. For example, central objects 302 provide the template that may be used by different orgunits 306 of a company. Each different orgunit 306 may customize the local object.

When the assignment of central sub-process 202 to an orgunit 306 occurs, copying of the data model for central sub-process 202 and central control 208 is performed to create a corresponding local sub-process 308 and a local control 310. In copying the data model for central sub-process 202, the template of data model 200 is propagated to local sub-process 308. That is, the modeled risks 206 of central sub-process 202 may be inherited to local sub-process 308. The inheritance is provided by storing a relationship between central sub-process 202 and local sub-process 308 in the relation table. For example, the relationship may be via foreign key using a central sub-process ID and a local sub-process ID. Then, any inherited risk 206 from central sub-process 202 may be found for local sub-process 308 via the link.

Orgunits 306 may then use data model 200 to model their organizations' data. For example, risks 206 linked to central sub-process 202 may be adjusted by orgunit 306. In one example, unnecessary risks may be removed from local sub-process 308. In one embodiment, a list of removed risks is stored in a removed objects table 312. For example, risk IDs for the removed risks 206 are stored in removed objects table 312 to indicate the risks have been removed for local sub-processes 308. Also, if risks 206 are inherited from an object other than central sub-process 202 (e.g., control objective, account group/assertion), then the ID for that object is also stored, such as the control objective ID or account group ID/assertion ID. Thus, the risks for local sub-process 308 are, in sum, the inherited risks 206 from central sub-process 202 minus the removed risks 206 locally. Accordingly, central controlling of risks 206 for local sub-process 308 is supported and each local sub-process 308 has the freedom and flexibility to remove unnecessary risks. Also, once risks 206 are added centrally, they can be assigned to local sub-processes 308 automatically.

Particular embodiments also allow for the removal of account groups 210 and control objectives 214. When control objectives 214 or account groups 210 are removed locally, the removed control objective ID, or account group ID/assertion ID is stored in removed objects table 312 to indicate they have been removed for local sub-process 308.

Additionally, a risk mapping table may store local control risk mapping. For example, if a user wants to assign a risk 206 on a more detailed level, local control 310 may be linked with risk 206. Risk 206 may be restricted such that it can be seen from current local sub-process 308. In one embodiment, risks 206 from a local sub-process 308 are only allowed to be linked to controls 208 under that local sub-process 308. Control 208 can be linked to all the types of risks 206 from local sub-process 308. This covers the risk in local sub-process 308 and mitigates it.

Figure 4:
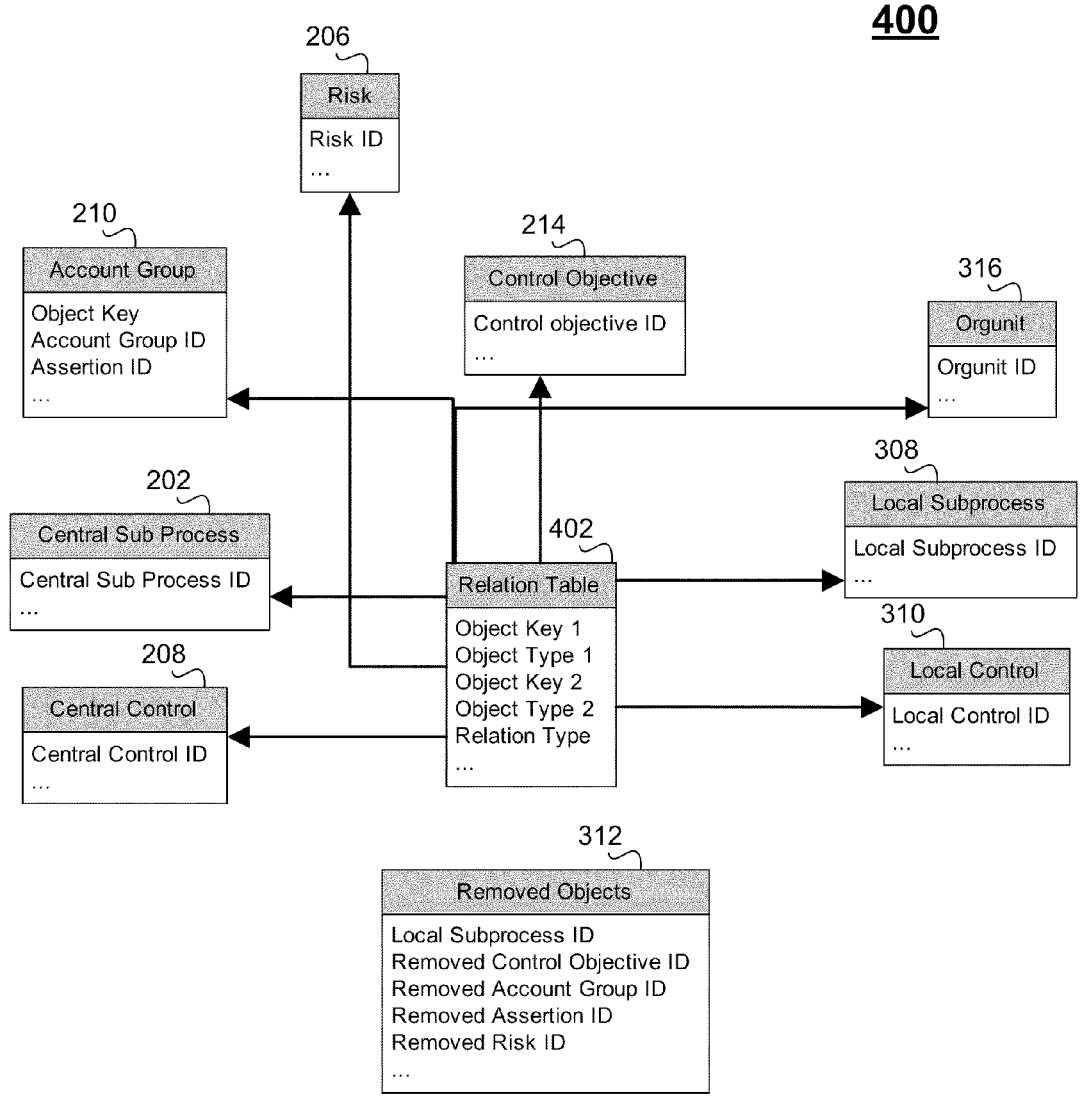
FIG. 4 depicts an entity relationship in the data model according to one embodiment.

FIG. 4 depicts an entity relationship 400 in data model 200 according to one embodiment. The purpose of data model 200 is to model the relationship between risks 206 and central sub-process 202/controls 208. Also, data model 200 supports identifying risks 206 for central sub-process 202/controls 208 from different risk sources. Risks 206 may then be assessed from different risk sources at different orgunits 306. Based on an assessed risk level for local sub-processes 308 and controls 208, evaluation and testing according to the risk levels is performed as will be described in more detail below.

The entity relationship shown in FIG. 4 shows links between various objects in data model 200. These links allow data objects to be linked in the data structure stored in database 104. A relation table 402 is stored in database 104 and is used to determine links between objects in data model 200. For example, central sub-process 202 may be linked with local sub-process 308 through a central sub-process ID and a local sub-process ID. Also, account groups 210 may be linked with orgunits 306 through an object key, account group ID/assertion ID, and an orgunit ID. Central control 208 may be linked with local control 310 through a central control ID and local control ID. Control objective 214, account group 210, and local sub-process 308 may be linked to risks 206 through a risk ID, object key, and the corresponding IDs for account group 210, control objective 214, and local sub-process 308.

A removed objects table 312 also stores IDs for removed control objectives, removed account groups, removed assertions, and removed risks for a local sub-process.

Figure 5:
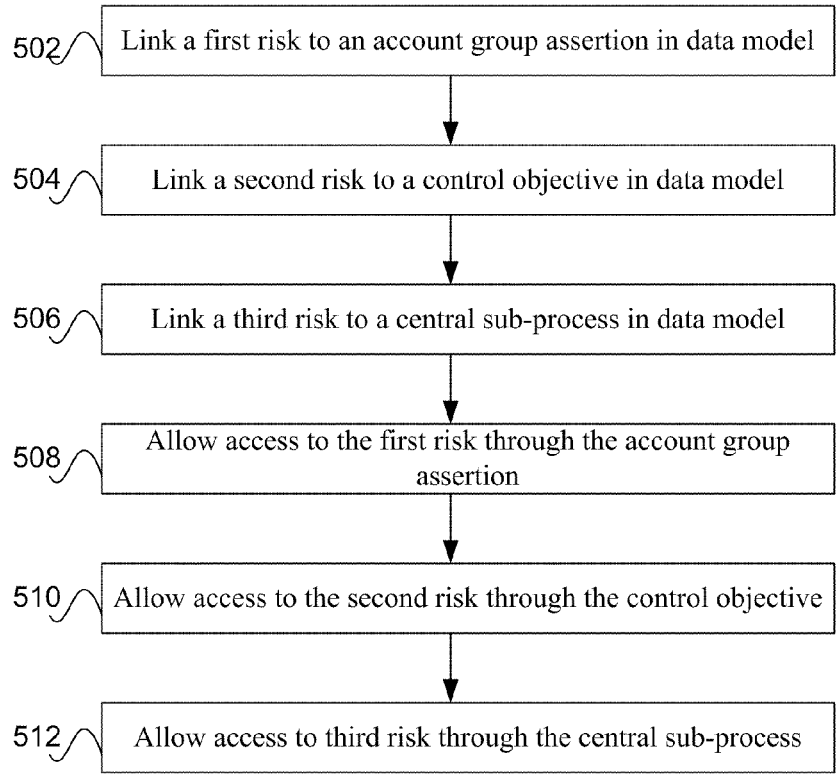
FIG. 5 depicts a simplified flowchart of a method for accessing data according to one embodiment.

The following will now describe the use of data model 200. FIG. 5 depicts a simplified flowchart 500 of a method for accessing data according to one embodiment. At 502, a first risk 206c is linked to an account group assertion in data model 200. At 504, a second risk 206a is linked to a control objective 214 in data model 200. At 506, a third risk 206b is linked to a central sub-process 202 in data model 200.

At 508, access is granted to the first risk 206c through account group assertion 212. For example, first risk 206c is accessed by accessing account group 210 through central sub-process 202. Then, first risk 206c is accessed through account group 210. At 510, access to the second risk 206a is granted through control objective 214. For example, control objective 214 is accessed from central sub-process 202. Then, second risk 206a is accessed through control objective 214. At 512, access to third risk 206b is granted through central sub-process 202. The above risks 206a-206c may be accessed to perform risk management, which will be described below in more detail.

Figure 6:
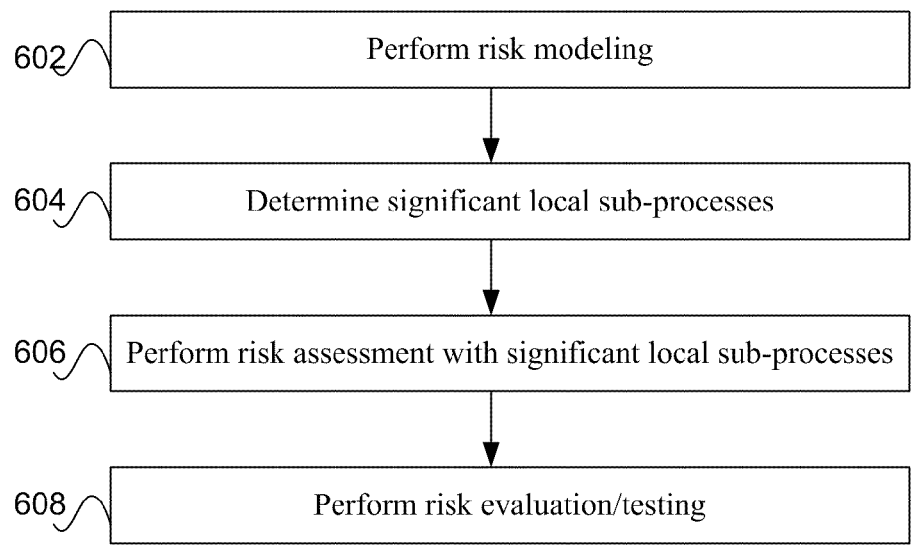
FIG. 6 depicts a simplified flowchart of an overall process for risk management according to one embodiment.
Figure 7:
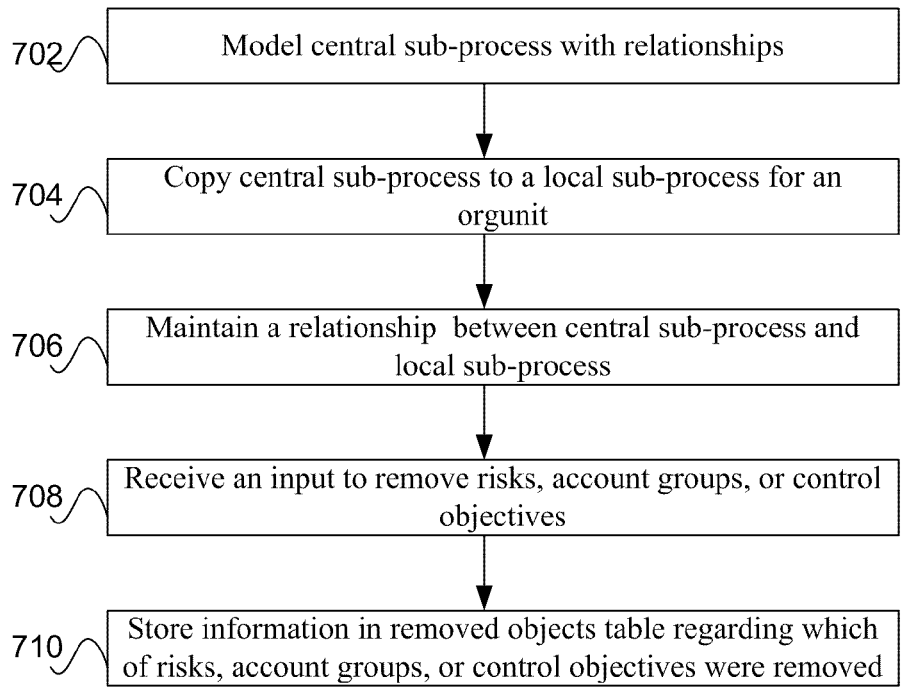
FIG. 7 depicts a simplified flowchart of a method for risk modeling according to one embodiment.

FIG. 6 depicts a simplified flowchart of an overall process for risk management according to one embodiment. At 602, risk modeling is performed. Risk modeling includes setting relationships to be used to store data in the data structure stored in database 104. FIG. 7 depicts a simplified flowchart 700 of a method for risk modeling according to one embodiment. At 702, central sub-process 202 may be modeled with objects including the relationships described above with respect to FIGS. 2 and 3. At 704, central sub-process 202 is copied to local sub-process 308 for an orgunit 306. At 706, a relationship is maintained between central sub-process 202 and local sub-process 308. For example, a link may be stored in relation table 402.

At 708, an input is received to remove risks 206, account groups 210, or control objectives 214. At 708, information is stored in removed objects table 312 regarding which of risks 206, account groups 210, or control objectives 214 were removed. Thus, the total of inherited risks to local sub-process 308 are risks 206 modeled for central sub-process 202 minus the removed risks 206.

Figure 8:
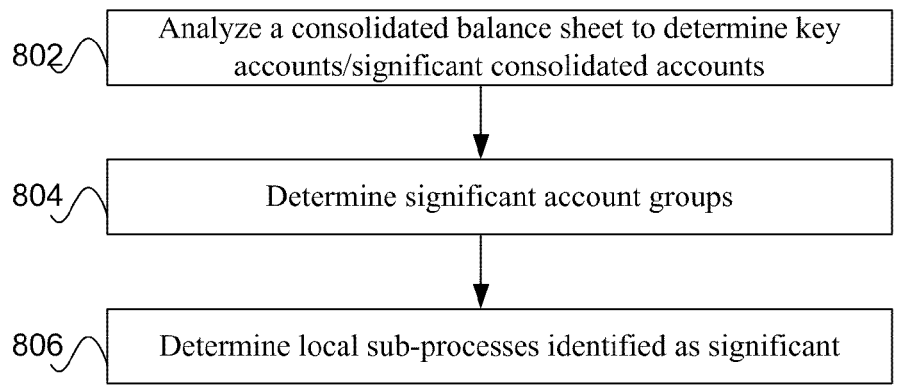
FIG. 8 depicts a simplified flowchart for determining significant sub-processes according to one embodiment.

Referring back to FIG. 6, at 604, risk management application 102 determines significant local sub-processes 308. Evaluation/testing of all risks 206 may not be performed. Rather, certain significant risks 206 may be determined by determining significant local sub-processes 308, and then evaluating a set of key risks 206 associated with significant local sub-processes 308. The following approach uses a top-down risk management approach. FIG. 8 depicts a simplified flowchart 800 for determining significant local sub-processes 308 according to one embodiment. At 802, risk management application 102 analyzes a consolidated balance sheet to determine key accounts/significant consolidated accounts. The consolidated balance sheet may be the balance sheet for the whole company (i.e., a consolidated balance sheet of all orgunits 306). In this case, account group balances can be uploaded from database 104. In one example, risk management application 102 can map account fields (mainly account group ID, name, orgunit, balance), with fields in a source system (e.g., a financial system) and then the data is directly retrieved from the source system. The data is then mapped to a data format and stored in an application table.

After the account group balances are uploaded, at 804, risk management application 102 determines significant account groups 210. For example, a threshold value may be stored in risk management application 102 and is used to determine significant account groups. In one example, the uploaded balance for each account group 210 is compared to the threshold. If the balance is larger than the threshold, then the account group is set as significant. The threshold may be adjusted at any time. For example, the threshold may be adjusted at audit time to a value below a centrally specified threshold, adjusted upwards to match inflation, to a value specified by a company's audit committee, or the like. Alternatively, a user may set a flag indicating an account group 210 is significant.

At 806, risk management application 102 determines local sub-processes 308 identified as significant. The determined local sub-processes 308 may be determined automatically based on the parent-child relationship in data model 200. That is, local sub-processes 308 that are parents of significant account groups 210 are determined as significant.

Referring back to FIG. 6, at 606, risk assessment is then performed with significant local sub-processes 308. Risk assessment may be triggered automatically on planned dates. Risk assessment is performed for risks 206*a*, 206*b*, and 206*c*. For data model 200, risks 206*c* may be accessed from account groups 210, risks 206*a* may be accessed from control objectives 214, and risks 206*b* may be accessed directly assigned to local sub-process 308. Risk assessment assigns different values to risks based on an assessment. The assessment may be based on user input (e.g., from surveys) or be determined automatically.

In one embodiment, assertions for the significant account groups 210 are assessed. The risks associated with the assertions need to be accessed from database 104 for the assessment to be performed. For example, risks 206*c* that are associated with assertions for significant account groups 210 are accessed using a link from the significant account groups 210 to risks 206*c*.

Figure 9:
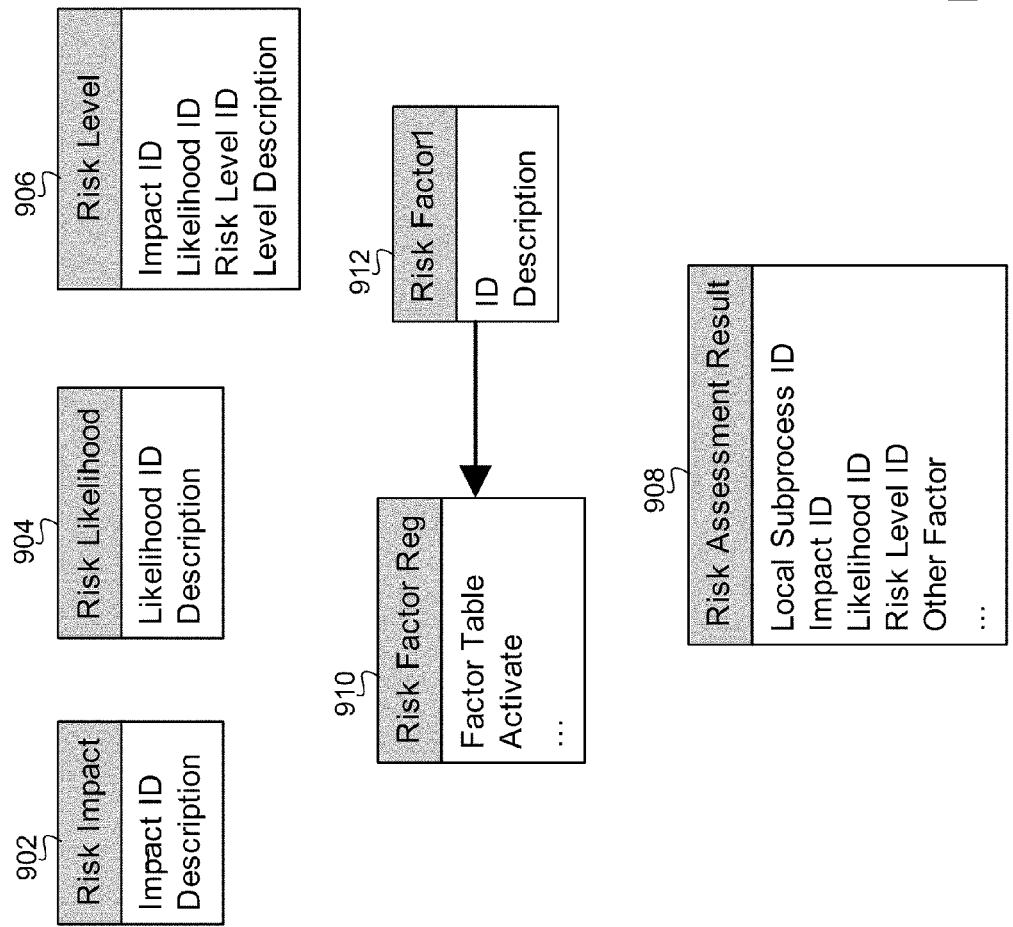
FIG. 9 shows an example of configuration tables to assess risk according to one embodiment.

In one embodiment, configuration tables may be maintained to assess risk. FIG. 9 shows an example of the configuration tables according to one embodiment. The risk may be assessed using a risk level. A risk level may be different levels that are configured by a user. A risk level refers to a level of severity of a risk and corresponds to a defined risk level, such as H (high), M (medium), or L (low). Other risks levels may also be used.

Figure 10:
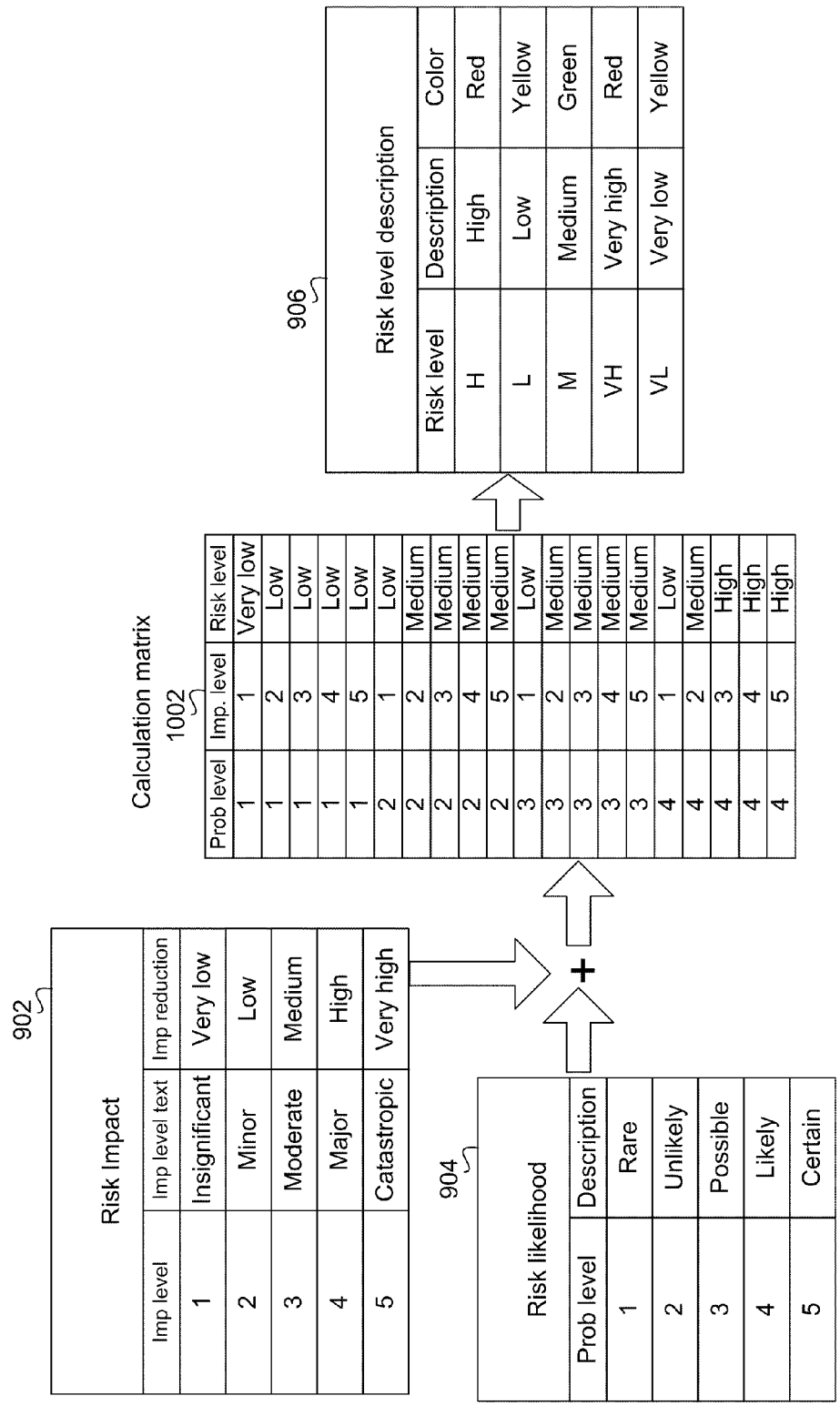
FIG. 10 shows an example of determining a risk level according to one embodiment.

A combination of the risk impact 902 and risk likelihood 904 corresponds to a defined risk level 906. A calculation matrix may be used to determine the risk level based on a risk impact and risk likelihood. For example, FIG. 10 shows an example of determining a risk level according to one embodiment. Values for risk impact 902 are shown. Levels 1-5 may be provided, but other levels may be used. The levels may be defined by impact level text and impact reduction. The impact level text is a description of the level of the impact. Also, the impact reduction is a level of effort that is taken to reduce the risk.

Risk likelihood 904 is the probability of the risk occurring. Levels 1-5 may be provided, but other levels may be used. Risk impact 902 and risk likelihood 904 may be defined by users or may be automatically determined In one embodiment, surveys may be sent to users to assess risk impact 902 and risk likelihood 904. In the survey, the users may rate risk impact 902 and risk likelihood 904 with different values.

A calculation matrix 1002 is then used to determine risk level 906. Calculation matrix 1002 takes the values from risk impact 902 and risk likelihood 904 and determines risk level 906. For example, a risk likelihood of the value of 2 and a risk impact of the value of 3 results in a medium risk level. From calculation matrix 1002, it can be seen that different risk levels 906 can be determined. For example, risk level 906 may be characterized in the risk of levels high, low, medium, very high, and very low.

The calculated risk level 906 may be calculated and displayed to a user. Risk level colors may also be displayed to indicate the level. Also, the user may choose to overwrite the calculation or accept it.

Referring back to FIG. 9, the different values for risk impact 902, risk likelihood 904, and risk level 906 are maintained. The data received from the risk assessments for risk impact 902, risk likelihood 904, and risk level 906 may be stored. For example, each risk impact object, risk likelihood object and risk level may be identified by an impact ID, likelihood ID, and risk level ID, respectively. For each risk that is assessed for local sub-process 308, the sub-process ID, impact ID, likelihood ID, and risk level ID for each risk is stored in a risk assessment result table 908. If the risk assessment is performed by multiple users or multiple times, it can be configured which result may be stored, such as the worst risk level of the results or a weighted result.

A risk factor RFG table 910 is used for a user to register his/her own factor definition. The user can create his/her own table 912 for risk factor 1 and register it to risk factor RFG table 910. A risk factor 1 is a customer defined factor that can be used to describe risk/assess risk level. At runtime, this factor is considered the same as factors such as risk impact 902 but it does not help decide the risk level.

After assessing risk, the key risks are determined based on their risk level. For example, risks rated as high risk (e.g., very high, high, or medium) may be considered key and risks rated as low risk (e.g., very low or low) may be considered as not key. The risks rated as key may then be evaluated and tested.

The risk level on key sub-processes 308 is used as a selection criterion for a user to select the sub-process to plan an evaluation/testing activity. For example, a business rule at a customer site may only care about high and medium risk sub-processes. A company can then choose to evaluate controls for high and medium risk sub-processes 308. In this way, an auditor can focus on significant sub-processes and controls that are high risk and could cause material weakness. This makes auditors more efficient and effective and can save a company costs per audit.

Referring back to FIG. 6, at 610, after key risks 206 are determined, risk management application 102 performs risk evaluation/testing. For discussion purposes, the term evaluation is used and may encompass evaluation and/or testing. In evaluation, controls associated with risks 206 that are determined to be key are evaluated. For example, risks 206 are associated with controls in data model 200. These controls may be accessed and evaluated to determine if they are effective or not.

A level of evidence may be used to develop an evaluation/testing strategy for a control. The level of evidence is determined based on calculations of risk level and control risk level. The level of evidence may be the amount of evidence that needs to be shown to satisfy the control. In one example, a control on a financial transaction may be a receipt or confirmation that is generated from the transaction. The level of evidence is the presence of the receipt or confirmation.

Risk level 906 may be used as one part of the calculation to determine the level of evidence. A control risk level is also used and may be the risk level if the control 208 is used to mitigate/cover risk 206.

FIG. 11 shows an example of a calculation matrix 1100 that may be used to determine the level of evidence according to one embodiment. In a column 1102, risk level 906 is shown. Also, in a row 1104, the control risk level is shown. The intersection of these two levels provides the level of evidence. In one example, a level of 1 indicates that no testing is needed; a level of 2 indicates that self-assessment should be used as a test strategy; and a level of 3 indicates that a direct test should be used as a test strategy. A self-assessment test strategy may be where an individual user assesses the control. A direct test may be when a company creates a test. The self assessment and direct tests are a workflow driven process that is used to assess or test certain control 208, local sub-process 308 and orgunits 306, and identify issues for them.

The level of evidence is then used to create a test for evaluate the control. Once the test is created the control may be evaluated by an auditor.

Accordingly, a top down approach has been provided that is supported by data model 200. For example, risks are linked to control objectives 214, local sub-processes 308, and account groups 210. The risks may be accessed from these entities and used in risk management. The top-down approach requires that risks 206 be accessed from different risk sources and data model 200 facilitates this access.

Figure 12:
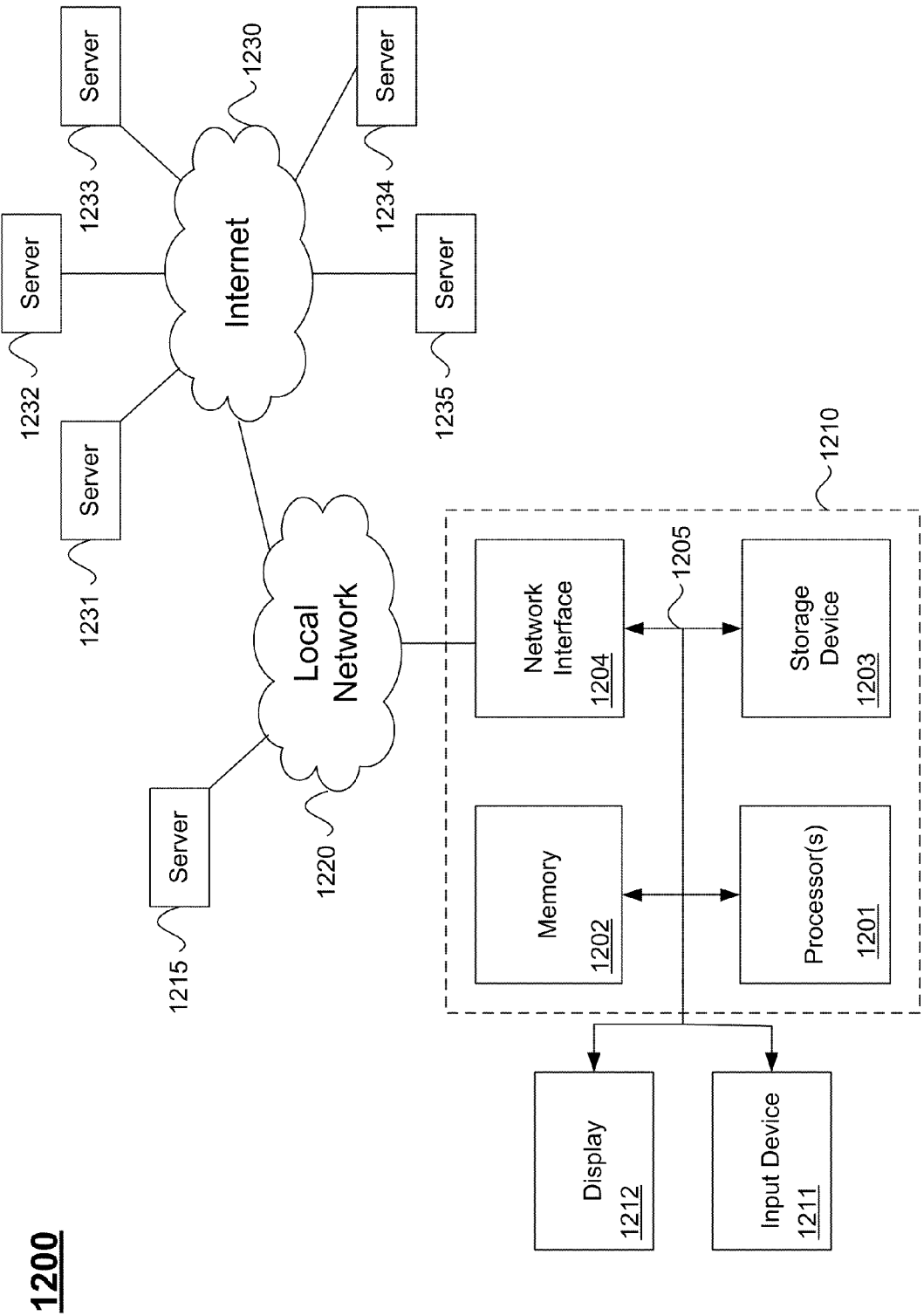
FIG. 12 shows an example computer system for executing embodiments of the present invention.

FIG. 12 illustrates hardware used to implement embodiments of the present invention. An example computer system 1210 is illustrated in FIG. 12. Computer system 1210 includes a bus 1205 or other communication mechanism for communicating information, and one or more processors 1201 coupled with bus 1205 for processing information. Computer system 1210 also includes a memory 1202 coupled to bus 1205 for storing information and instructions to be executed by processor 1201, including information and instructions for performing the techniques described above, for example. This memory may also be used for storing variables or other intermediate information during execution of instructions to be executed by processor 1201. Possible implementations of this memory may be, but are not limited to, random access memory (RAM), read only memory (ROM), or both. A machine (computer) readable storage device 1203 is also provided for storing information and instructions. Common forms of storage devices include, for example, a non-transitory electromagnetic medium such as a hard drive, a magnetic disk, an optical disk, a CD-ROM, a DVD, a flash memory, a USB memory card, or any other medium from which a computer can read. Storage device 1203 may include source code, binary code, or software files for performing the techniques above, for example. Storage device 1203 and memory 1202 are both examples of computer readable mediums.

Computer system 1210 may be coupled via bus 1205 to a display 1212, such as a cathode ray tube (CRT) or liquid crystal display (LCD), for displaying information to a computer user. An input device 1211 such as a keyboard and/or mouse is coupled to bus 1205 for communicating information and command selections from the user to processor 1201. The combination of these components allows the user to communicate with the system. In some systems, bus 1205 may be divided into multiple specialized buses.

Computer system 1210 also includes a network interface 1204 coupled with bus 1205. Network interface 1204 may provide two-way data communication between computer system 1210 and the local network 1220, for example. The network interface 1204 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1204 sends and receives electrical, electromagnetic, or optical signals that carry digital data streams representing various types of information.

Computer system 1210 can send and receive information, including messages or other interface actions, through the network interface 1204 across a local network 1220, an Intranet, or the Internet 1230. For a local network, computer system 1210 may communicate with a plurality of other computer machines, such as server 1215. Accordingly, computer system 1210 and server computer systems represented by server 1215 may be programmed with processes described herein. In the Internet example, software components or services may reside on multiple different computer systems 1210 or servers 1231-1235 across the network. Embodiments of the processes described above may be implemented on one or more servers, for example. A server 1231 may transmit actions or messages from one component, through Internet 1230, local network 1220, and network interface 1204 to a component on computer system 1210. The software components and processes described above may be implemented on any computer system and send and/or receive information across a network, for example.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
   storing a first link that links a first risk to an account group in a first table in a data structure of a database;
   storing a second link that links a second risk to a control objective in a second table in the data structure, wherein the control objective is an objective of a control for managing risk; and
   performing, by a computing device, risk management by accessing both the first risk through the account group and the second risk through the control objective, wherein the risk management requires that the first risk is accessible due to the account group being accessed first from the data structure before accessing the first risk and the second risk is accessible due to the control objective being accessed first from the data structure before accessing the second risk, wherein performing risk management comprises:
   accessing the account group from the data structure;
   accessing the first link in the first table, the first link accessible via accessing the account group;
   accessing the first risk using the first link, wherein the first risk is accessible due to the account group being accessed first from the data structure and then the first link being accessed via the account group and used to access the first risk;
   accessing the control objective from the data structure;
   accessing the second link in the second table, the second link accessible via the control objective; and
   accessing the second risk using the second link, wherein the second risk is accessible due to the control objective being accessed first from the data structure and then the second link being accessed via the control objective and used to access the second risk.

2. The method of claim 1, further comprising:
   storing a third link that links a third risk to a central sub-process in a third table in the data structure; and
   accessing the central sub-process from the data structure;
   accessing the third link in the third table, the third link accessible via accessing the central sub-process;
   accessing the third risk using the third link, wherein the third risk is accessible due to the central sub-process being accessed first from the data structure and then the third link being accessed via the central sub-process and used to access the third risk.

3. The method of claim 1, further comprising:
   linking the account group to a central sub-process, wherein the first risk is inherited to the central sub-process.

4. The method of claim 3, wherein accessing the first risk comprises:
   determining an account group assertion for the account group from the central sub-process; and
   accessing the first risk for the account group assertion using the determined account group.

5. The method of claim 2, further comprising linking the control objective to the central sub-process, wherein the second risk is inherited to the central sub-process.

6. The method of claim 5, wherein accessing the second risk comprises:
   accessing the control objective from the central sub-process; and
   accessing the second risk using the determined control objective.

7. The method of claim 2, further comprising copying the central sub-process to an organization to create a local sub-process, wherein the local sub-process inherits the first risk and the second risk from the central sub-process.

8. The method of claim 7, further comprising storing a fourth link in the data structure linking the central sub-process with the local sub-process.

9. The method of claim 7, further comprising:
   determining a request to remove one of the first risk or the second risk in the local sub-process; and
   storing information indicating the one of the first risk or the second risk that has been removed.

10. The method of claim 9, wherein the removed one of the first risk or the second risk is not evaluated in risk management for the local sub-process.

11. The method of claim 7, further comprising:
    determining a request to remove one of the control objective or the account group in the local sub-process; and
    storing information indicating the one of the control objective or the account group that has been removed,
    wherein the removed one of the control objective or the account group is not evaluated in risk management for the local sub-process.

12. The method of claim 1, wherein performing risk management comprises performing risk assessment using data for the first risk and the second risk stored in the data structure.

13. The method of claim 12, further comprising:
    determining a first control for the first risk and a second control for the second risk; and
    performing risk evaluation using the first control and the second control.

14. A non-transitory computer-readable storage medium containing instructions for controlling a computer system to perform a method, the method comprising:
    storing a first link that links a first risk to an account group in a first table in a data structure of a database;
    storing a second link that links a second risk to a control objective in a second table in the data structure, wherein the control objective is an objective of a control for managing risk; and
    performing risk management by accessing both the first risk through the account group and the second risk through the control objective, wherein the risk management requires that the first risk is accessible due to the account group being accessed first from the data structure before accessing the first risk and the second risk is accessible due to the control objective being accessed first from the data structure before accessing the second risk, wherein performing risk management comprises:
    accessing the account group from the data structure;
    accessing the first link in the first table, the first link accessible via accessing the account group;
    accessing the first risk using the first link, wherein the first risk is accessible due to the account group being accessed first from the data structure and then the first link being accessed via the account group and used to access the first risk;
    accessing the control objective from the data structure;
    accessing the second link in the second table, the second link accessible via the control objective; and
    accessing the second risk using the second link, wherein the second risk is accessible due to the control objective being accessed first from the data structure and then the second link being accessed via the control objective and used to access the second risk.

15. The non-transitory computer-readable storage medium of claim 14, further comprising:

storing a third link that links a third risk to a central sub-process in a third table in the data structure; and
accessing the central sub-process from the data structure;
accessing the third link in the third table, the third link accessible via accessing the central sub-process;
accessing the third risk using the third link, wherein the third risk is accessible due to the central sub-process being accessed first from the data structure and then the third link being accessed via the central sub-process and used to access the third risk.

16. The non-transitory computer-readable storage medium of claim 14, further comprising:
    linking the account group to a central sub-process, wherein the first risk is inherited to the central sub-process.

17. The non-transitory computer-readable storage medium of claim 15, wherein accessing the first risk comprises:
    determining an account group assertion for the account group from the central sub-process; and
    accessing the first risk for the account group assertion using the determined account group.

18. The non-transitory computer-readable storage medium of claim 15, further comprising linking the control objective to the central sub-process, wherein the second risk is inherited to the central sub-process.

19. The non-transitory computer-readable storage medium of claim 18, wherein accessing the second risk comprises:
    accessing the control objective from the central sub-process; and
    accessing the second risk using the determined control objective.

20. An apparatus comprising:
    one or more computer processors; and
    a computer-readable storage medium comprising instructions for controlling the one or more computer processors to be operable for:
    storing a first link that links a first risk to an account group in a first table in a data structure of a database;
    storing a second link that links a second risk to a control objective in a second table in the data structure, wherein the control objective is an objective of a control for managing risk; and
    performing risk management by accessing both the first risk through the account group and the second risk through the control objective, wherein the risk management requires that the first risk is accessible due to the account group being accessed first from the data structure before accessing the first risk and the second risk is accessible due to the control objective being accessed first from the data structure before accessing the second risk, wherein performing risk management comprises:
    accessing the account group from the data structure;
    accessing the first link in the first table, the first link accessible via accessing the account group;
    accessing the first risk using the first link, wherein the first risk is accessible due to the account group being accessed first from the data structure and then the first link being accessed via the account group and used to access the first risk;
    accessing the control objective from the data structure;
    accessing the second link in the second table, the second link accessible via the control objective; and
    accessing the second risk using the second link, wherein the second risk is accessible due to the control objective being accessed first from the data structure and then the second link being accessed via the control objective and used to access the second risk.

* * * * *